(12) United States Patent
Oh et al.

(10) Patent No.: US 11,747,697 B2
(45) Date of Patent: Sep. 5, 2023

(54) ELECTROCHROMIC DEVICE

(71) Applicant: SKC CO., LTD., Gyeonggi-do (KR)

(72) Inventors: Seung Bae Oh, Gyeonggi-do (KR);
Seong Hwan Lee, Gyeonggi-do (KR);
Yong Sang La, Gyeonggi-do (KR);
Hyung Mo Kim, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 184 days.

(21) Appl. No.: 17/342,623

(22) Filed: Jun. 9, 2021

(65) Prior Publication Data

US 2021/0389639 A1  Dec. 16, 2021

(30) Foreign Application Priority Data

Jun. 10, 2020 (KR) .................. 10-2020-0070598

(51) Int. Cl.
| | | |
|---|---|---|
| *G02F 1/157* | (2006.01) | |
| *G02F 1/01* | (2006.01) | |
| *G02F 1/15* | (2019.01) | |
| *G09G 3/19* | (2006.01) | |
| *G02F 1/163* | (2006.01) | |
| *G02F 1/155* | (2006.01) | |
| *E06B 9/24* | (2006.01) | |
| *G02F 1/153* | (2006.01) | |

(52) U.S. Cl.
CPC .............. *G02F 1/163* (2013.01); *E06B 9/24* (2013.01); *G02F 1/155* (2013.01); *G02F 1/1533* (2013.01); *E06B 2009/2464* (2013.01)

(58) Field of Classification Search
CPC .... G02F 1/0316; G02F 1/1525; G02F 1/1521; G02F 1/1533; G02F 1/03; G02F 3/16; G02F 1/163; G02F 1/155; G02F 1/1523; C09K 9/02; B60R 1/088; H04N 9/3137; H04N 9/22

USPC .............. 359/265–277, 245–247, 254, 242; 345/49, 105; 250/70; 438/929; 348/817
See application file for complete search history.

(56) References Cited

U.S. PATENT DOCUMENTS

| | | | | |
|---|---|---|---|---|
| 2010/0238535 | A1* | 9/2010 | Wang ................. | C09K 9/00 359/275 |
| 2012/0200908 | A1* | 8/2012 | Bergh ................. | G02F 1/155 174/250 |
| 2019/0219883 | A1* | 7/2019 | Kim ................... | G02F 1/1516 |

FOREIGN PATENT DOCUMENTS

| | | |
|---|---|---|
| KR | 10-2017-0101702 A | 9/2017 |
| KR | 10-1862200 B1 | 7/2018 |
| KR | 10-2020-0047889 A | 5/2020 |

OTHER PUBLICATIONS

Office Action issued by Korean Patent Office dated Jun. 29, 2021.

* cited by examiner

*Primary Examiner* — Dawayne Pinkney
(74) *Attorney, Agent, or Firm* — IP & T Group LLP

(57) ABSTRACT

The embodiments relate to an electrochromic device having flexibility while achieving an excellent light transmission adjusting function based on the electrochromic principle. The electrochromic device comprises a light transmission variable structure interposed between a first base layer and a second base layer, wherein the light transmission variable structure comprises a first chromic layer and a second chromic layer, the first chromic layer comprises a reducing chromic material, the second chromic layer comprises an oxidizing chromic material, and the value of c as defined in Equation 1 is 1.0 to 1.6.

9 Claims, 3 Drawing Sheets

ELECTROCHROMIC DEVICE

The present application claims priority of Korean patent application number 10-2020-0070598 filed on Jun. 10, 2020. The disclosure of each of the foregoing applications is incorporated herein by reference in its entirety.

TECHNICAL FIELD

Embodiments relate to an electrochromic device having flexibility while achieving an excellent light transmission adjusting function based on the electrochromic principle.

BACKGROUND ART

In recent years, as interest in environmental protection has increased, interest in technologies that enhance energy efficiency is also increasing. As an example, research and development on technologies such as smart windows and energy harvesting are being actively conducted. A smart window among them refers to an active control technology that adjusts the degree of transmission of light coming from the outside to enhance energy efficiency and to provide a pleasant environment to the users. It is a fundamental technology that can be commonly applied to various industrial fields. A smart window is based on electrochromism. Electrochromism is a phenomenon in which an electrochemical oxidation or reduction reaction takes place as electric power is applied, and an inherent color or optical properties such as light transmittance of an electrochromically active material are changed accordingly.

In the past, solar radiation was blocked using blinds or curtains to prevent sunlight and heat from entering the inside, and a functional film was attached to the building glass to produce an effect to a certain extent. However, it was just a passive blocking that could not respond to changes in season, weather, and day and night. In recent years, technologies for active blocking have been introduced. However, most of them are technologies related to glass-type smart windows in which an electrochromic device is applied between several sheets of glass. However, its manufacturing process is complicated, and the product price is very high since the size of the product is to be tailored to the size of a window to be constructed, so that there are difficulties in commercializing it. In addition, there are also problems in that if a silicone finish is applied, moisture may penetrate, resulting in a risk of a short circuit, that it occupies a lot of storage space during logistics transportation, and that it is fragile to external impact and thus dangerous due to the nature of the material.

Thus, there has been a continuous demand for research on a smart window that is capable of solving the above problems and achieving an excellent light transmission adjusting function.

PRIOR ART DOCUMENT (Patent Document 1) Korean Patent No. 1862200 (May 23, 2018)

DISCLOSURE OF INVENTION

Technical Problem

The embodiments aim to provide an electrochromic device having flexibility while achieving an excellent light transmission adjusting function based on the electrochromic principle.

Solution to Problem

The electrochromic device according to an embodiment comprises a light transmission variable structure interposed between a first base layer and a second base layer, wherein the light transmission variable structure comprises a first chromic layer and a second chromic layer, the first chromic layer comprises a reducing chromic material, the second chromic layer comprises an oxidizing chromic material, and the value of c as defined in the following Equation 1 is 1.0 to 1.6.

$$c = T2/T1 \times b/a \qquad \text{[Equation 1]}$$

In Equation 1, T1 (coloring time) is the time (s) for which the transmittance of visible light changes from 65% to 15% when an electric power of 3V is applied to the electrochromic device, T2 (decoloring time) is the time (s) for which the transmittance of visible light changes from 15% to 65% when the current direction is reversed after the coloring time is measured, a is the thickness (nm) of the first chromic layer, and b is the thickness (nm) of the second chromic layer.

Advantageous Effects of Invention

In the electrochromic device according to the embodiment, the thickness ratio of the chromic layers and the time ratio of coloration/decoloration are properly adjusted. Thus, it is possible to not only secure a wide range of changes in transmittance of visible light, but also achieve an excellent blocking performance of UV rays and an excellent blocking performance of IR rays, which enables controlling light and heat coming from the outside through just a simple operation.

Specifically, the electrochromic device has a characteristic that the light transmittance is reversibly changed when electricity is applied. Thus, it is possible to selectively control the transmittance of visible light, UV rays, and IR rays through a simple operation such as pressing a button, whereby it is possible to control indoor brightness and to save energy for indoor heating/cooling.

The electrochromic device according to the embodiment achieves an excellent light transmission variable function based on the electrochromic principle while securing mechanical properties with flexibility. Thus, it is possible to overcome the limitations that it had to be applied only in a firm structure in the prior art and to secure a desired technical means simply by attaching it to a structure such as a conventional transparent window.

In addition, it can be easily cut and attached to fit various window sizes. It can be applied to curved windows without deteriorating the performance by virtue of its flexible characteristics, resulting in excellent workability and a low possibility of breakage. It can be stored in a roll form, thereby reducing logistics costs. It is convenient to store and transport.

[Explanation of Reference Numerals]

| | |
|---|---|
| A-A': cutting line | 10: window |
| 100: electrochromic device | 110: first base layer |
| 111: first-A primer layer | 112: first-B primer layer |
| 120: first barrier layer | 121: first-A barrier layer |
| 122: first-B barrier layer | 123: first-C barrier layer |
| 130: light transmission variable structure | 131: first electrode layer |
| 133: first chromic layer | 135: electrolyte layer |
| 137: second chromic layer | 139: second electrode layer |
| 140: second barrier layer | 141: second-A barrier layer |
| 142: second-B barrier layer | 143: second-C barrier layer |
| 150: second base layer | 151: second-A primer layer |
| 152: second-B primer layer | 160: release film layer |
| 161: adhesive layer | 170: hard coat layer |

BEST MODE FOR CARRYING OUT THE INVENTION

Hereinafter, the embodiments will be described in detail with reference to the accompanying drawings so that those of ordinary skill in the art to which the present invention pertains can easily practice them. However, the embodiments may be implemented in various different forms and are not limited to the embodiments described in the present specification.

In the present specification, in the case where each film, window, panel, structure, or layer is mentioned to be formed "on" or "under" another film, window, panel, structure, or layer, it means not only that one element is directly formed on or under another element, but also that one element is indirectly formed on or under another element with other element(s) interposed between them.

In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is understood to encompass a singular or plural expression, interpreted in context, unless otherwise specified.

In addition, all numbers and expressions relating to quantities of components, reaction conditions, and the like used herein are to be understood as being modified by the term "about" unless specifically stated otherwise.

Throughout the present specification, the terms first, second, and the like are used to describe various components. But the components should not be limited by the terms. The terms are used for the purpose of distinguishing one component from another.

Electrochromic Device

The embodiments aim to provide an electrochromic device having flexibility while achieving an excellent light transmission adjusting function based on the electrochromic principle.

Figure 3:
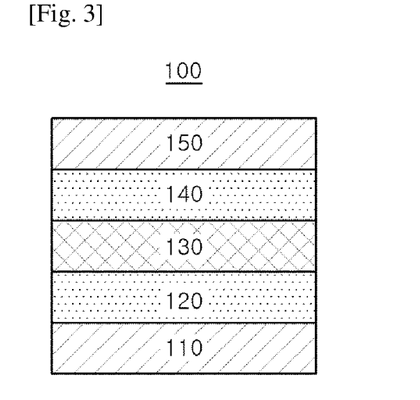
FIG. 3 schematically shows a cross-section of an electrochromic device according to an embodiment.
Figure 4:
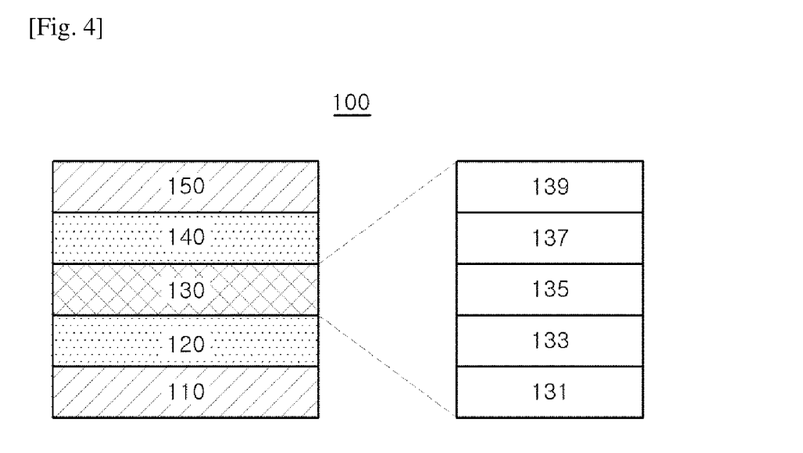
FIG. 4 schematically shows a cross-section of an electrochromic device and a light transmission variable structure according to an embodiment.

The electrochromic device (100) according to an embodiment comprises a light transmission variable structure (130) interposed between a first base layer (110) and a second base layer (150), wherein the light transmission variable structure (130) comprises a first chromic layer (133) and a second chromic layer (137) (see FIGS. 3 and 4).

The first chromic layer may comprise a reducing chromic material, and the second chromic layer may comprise an oxidizing chromic material.

The electrochromic device (100) has a value of c as defined in the following Equation 1 of 1.0 to 1.6.

$$c = T2/T1 \times b/a \qquad \text{[Equation 1]}$$

In Equation 1, T1 (coloring time) is the time (s) for which the transmittance of visible light changes from 65% to 15% when an electric power of 3V is applied to the electrochromic device, T2 (decoloring time) is the time (s) for which the transmittance of visible light changes from 15% to 65% when the current direction is reversed after the coloring time is measured, a is the thickness (nm) of the first chromic layer, and b is the thickness (nm) of the second chromic layer.

As the value of c defined in Equation 1 of the electrochromic device satisfies the above range, a wide range of changes in transmittance of visible light can be secured, and it is possible to achieve an electrochromic device stably having a certain level of performance or higher even by repeated coloration and decoloration.

If the value of c defined in Equation 1 exceeds the above range, the blocking rate of visible light may be decreased, or fine cracks or non-uniformity may appear during coloration and decoloration. Specifically, there is a problem in that the operation time is delayed, so that the electrochromic performance cannot be stably achieved.

The electrochromic device (100) may have a b/a value of 1.5 to 2.2.

As described above, a is the thickness (nm) of the first chromic layer, and b is the thickness (nm) of the second chromic layer.

Specifically, the b/a value of the electrochromic device may be 1.5 to 2.1 or 1.5 to 2.0.

As the b/a value of the electrochromic device satisfies the above range, there is an effect that the band for color changes between transparency and darkness is wider, and the time for the color changes is shortened. In addition, as an excellent blocking performance of UV rays and an excellent blocking performance of IR rays are achieved, it is possible to easily control light and heat coming from the outside. As a result, it is possible to control indoor brightness, to block UV rays, and to save energy for indoor cooling/heating.

On the other hand, if the b/a value of the electrochromic device is outside the above range, the band for color changes between transparency and darkness may be very narrow, the time for the color changes is prolonged, so that the color may change very slowly, or the electrochromic device may not work even if electricity is applied thereto, and the blocking rate of UV rays and the blocking rate of IR rays may be deteriorated, so that the desired performance may not be achieved.

The first chromic layer (133) may comprise a material having a color development characteristic complementary to the electrochromic material contained in the second chromic layer (137). The complementary color development characteristic means that the types of reaction by which the electrochromic materials develop color are different from each other.

For example, if an oxidizing chromic material is used in the first chromic layer, a reducing chromic material may be used in the second chromic layer. If a reducing chromic material is used in the first chromic layer, an oxidizing chromic material may be used in the second chromic layer.

Specifically, the first chromic layer (133) may comprise a reducing chromic material, and the second chromic layer (137) may comprise an oxidizing chromic material.

The oxidizing chromic material refers to a material that changes color when an oxidation reaction takes place, and the reducing chromic material refers to a material that changes color when a reduction reaction takes place.

That is, in a chromic layer to which an oxidizing chromic material has been applied, if an oxidation reaction takes place, a coloration reaction would take place; and if a reduction reaction takes place, a decoloration reaction would take place. In a chromic layer to which a reducing chromic material has been applied, if a reduction reaction takes place, a coloration reaction would take place; and if an oxidation reaction takes place, a decoloration reaction would take place.

As such materials having complementary color development characteristics are contained in the respective chromic layers, coloration or decoloration can be simultaneously carried out in both layers. In addition, coloration or decoloration may be alternated according to the polarity of voltage applied to the electrochromic device.

As an embodiment, the first chromic layer (133) may comprise one or more selected from the group consisting of titanium oxide (TiO), vanadium oxide ($V_2O_5$), niobium oxide ($Nb_2O_5$), chromium oxide ($Cr_2O_3$), manganese oxide ($MnO_2$), iron oxide ($FeO_2$), cobalt oxide ($CoO_2$), nickel oxide ($NiO_2$), rhodium oxide ($RhO_2$), tantalum oxide ($Ta_2O_5$), iridium oxide ($IrO_2$), tungsten oxide ($WO_3$), viologen, and combinations thereof.

The second chromic layer (137) may comprise one or more selected from the group consisting of nickel oxide (e.g., NiO, $NiO_2$), manganese oxide (e.g., $MnO_2$), cobalt oxide (e.g., $CoO_2$), iridium-magnesium oxide, nickel-magnesium oxide, titanium-vanadium oxide, and combinations thereof. Alternatively, the second chromic layer (137) may comprise a Prussian blue-based pigment, but it is not limited thereto.

The value of a stands for the thickness (nm) of the first chromic layer. The a value may be greater than 100 nm. Specifically, the a value may be 120 nm or more, 150 nm or more, or 200 nm or more.

The value of b stands for the thickness (nm) of the second chromic layer. The b value may be less than 700 nm. Specifically, the b value may be 680 nm or less, 650 nm or less, or 600 nm or less.

In addition, the a+b value may be 450 nm to 950 nm, 500 nm to 950 nm, 450 nm to 900 nm, or 500 nm to 900 nm.

If the values of a and b satisfy the above ranges, an appropriate amount of ions may be retained. At the same time, it may be advantageous for thinning and securing the flexibility of an electrochromic device, and it is possible to achieve excellent transmittance change characteristics of visible light, UV rays, IR rays.

The electrochromic device (100) according to an embodiment comprises a first base layer (110); a first barrier layer (120) on the first base layer (100); a light transmission variable structure (130) on the first barrier layer (120); a second barrier layer (140) on the light transmission variable structure (130); and a second base layer (150) on the second barrier layer (140) (see FIG. 3).

Base Layer

The first base layer and the second base layer are layers for maintaining transparency and durability and comprise a polymer resin.

Specifically, the first base layer and the second base layer may each comprise one or more selected from the group consisting of polyethylene terephthalate (PET), polyethylene naphthalate (PEN), polycarbonate (PC), polyimide (PI), polycyclohexylenedimethylene terephthalate (PCT), polyethersulfone (PES), nylon, polymethyl methacrylate (PMMA), and cycloolefin polymer (COP), but it is not limited thereto. More specifically, the first base layer and the second base layer may each comprise polyethylene terephthalate (PET).

As the first base layer and the second base layer comprise the polymer resin described above, it is possible to achieve an electrochromic device having both durability and flexibility.

The first base layer and the second base layer each have a light transmittance of 80% or more for light having a wavelength of 650 nm. Specifically, the first base layer and the second base layer may each have a light transmittance of 85% or more or 90% or more for light having a wavelength of 650 nm.

In addition, the first base layer and the second base layer may each have a haze of 2.0% or less, 1.8% or less, or 1.5% or less.

The first base layer and the second base layer each have an elongation at break of 80% or more. Specifically, the first base layer and the second base layer may each have an elongation at break of 90% or more, 100% or more, or 120% or more. As the first base layer and the second base layer each satisfy a light transmittance and a haze in the above ranges, transparency can be attained. As they satisfy an elongation at break in the above range, flexibility can be attained.

The first base layer may have a thickness of 10 μm to 300 μm.

Specifically, the thickness of the first base layer may be 10 μm to 250 μm, 10 μm to 200 μm, 20 μm to 250 μm, 20 μm to 200 μm, 25 μm to 200 μm, 25 μm to 188 μm, or 50 μm to 150 μm, but it is not limited thereto.

The second base layer may have a thickness of 10 μm to 300 μm.

Specifically, the thickness of the second base layer may be 10 μm to 250 μm, 10 μm to 200 μm, 20 μm to 250 μm, 20 μm to 200 μm, 25 μm to 200 μm, 25 μm to 188 μm, or 50 μm to 150 μm, but it is not limited thereto.

As the first base layer and the second base layer satisfies a thickness within the above range, it is possible to achieve a thin, lightweight, and flexible electrochromic device, and it is advantageous for being made thin.

Barrier Layer

The barrier layers (the first barrier layer and the second barrier layer) serve to prevent the penetration of impurities including moisture or gas into the light transmission variable structure from the outside.

In an embodiment, the electrochromic device may further comprise a first barrier layer interposed between the first base layer and the light transmission variable structure; and a second barrier layer interposed between the second base layer and the light transmission variable structure.

The first barrier layer (120) and the second barrier layer (140) may each comprise two or more layers. Specifically, the first barrier layer (120) and the second barrier layer (140) may each comprise two layers or three layers (see FIG. 5).

Figure 5:
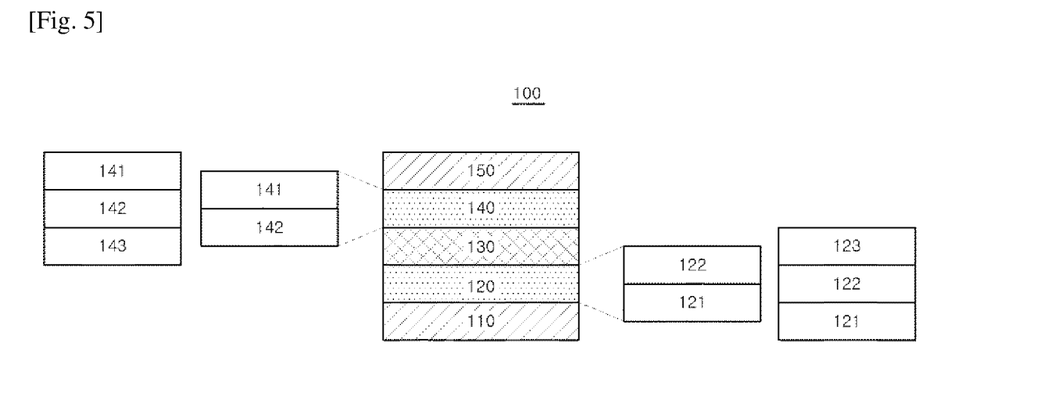
FIG. 5 schematically shows a cross-section of an electrochromic device and a barrier layer according to an embodiment.

In an embodiment, the first barrier layer (120) may comprise two layers, and the second barrier layer (140) may comprise two layers.

In another embodiment, the first barrier layer (120) may comprise three layers, and the second barrier layer (140) may comprise three layers.

The first barrier layer (120) may comprise a first-A barrier layer (121) and a first-B barrier layer (122), or the first barrier layer may comprise a first-A barrier layer (121), a first-B barrier layer (122), and a first-C barrier layer (123) (see FIG. 5).

Specifically, the first barrier layer may have a structure in which a first-A barrier layer and a first-B barrier layer are sequentially laminated; or a structure in which a first-A barrier layer, a first-B barrier layer, and a first-C barrier layer are sequentially laminated.

The first barrier layer may be laminated on the first base layer.

The second barrier layer (140) may comprise a second-A barrier layer (141) and a second-B barrier layer (142), or the second barrier layer may comprise a second-A barrier layer (141), a second-B barrier layer (142), and a second-C barrier layer (143) (see FIG. 5).

Specifically, the second barrier layer may have a structure in which a second-A barrier layer and a second-B barrier layer are sequentially laminated; or a structure in which a second-A barrier layer, a second-B barrier layer, and a second-C barrier layer are sequentially laminated.

The second barrier layer may be laminated under the second base layer.

In an embodiment, the first barrier layer (120) may comprise a first-A barrier layer (121) and a first-B barrier layer (122), and the second barrier layer (140) may comprise a second-A barrier layer (141) and a second-B barrier layer (142). Alternatively, the first barrier layer (120) may comprise a first-A barrier layer (121), a first-B barrier layer (122), and a first-C barrier layer (123), and the second barrier layer (140) may comprise a second-A barrier layer (141) and a second-B barrier layer (142).

The first barrier layer (120) comprises at least one selected from the group consisting of metal oxides, metal nitrides, metal oxynitrides, metalloid oxides, metalloid nitrides, metalloid oxynitrides, and combinations thereof.

Specifically, the first barrier layer (120) comprises at least one selected from the group consisting of metal nitrides, metal oxynitrides, metalloid nitrides, metalloid oxynitrides, and combinations thereof. More specifically, the first barrier layer (120) comprises a metal nitride or a metalloid nitride.

In addition, the second barrier layer (140) comprises at least one selected from the group consisting of metal oxides, metal nitrides, metal oxynitrides, metalloid oxides, metalloid nitrides, metalloid oxynitrides, and combinations thereof.

Specifically, the second barrier layer (140) comprises at least one selected from the group consisting of metal nitrides, metal oxynitrides, metalloid nitrides, metalloid oxynitrides, and combinations thereof. More specifically, the second barrier layer (140) comprises a metal nitride or a metalloid nitride.

In an embodiment, the first barrier layer (120) may comprise a first-A barrier layer (121) and a first-B barrier layer (122), wherein one of the first-A barrier layer and the first-B barrier layer may comprise a metal oxide or a metalloid oxide, and the other may comprise a metal nitride or a metalloid nitride.

The first barrier layer (120) may further comprise a first-C barrier layer (123). In such a case, the first-C barrier layer may comprise an acrylic-based resin, an epoxy-based resin, a silicone-based resin, a polyimide-based resin, or a polyurethane-based resin.

In addition, the second barrier layer (140) may comprise a second-A barrier layer (141) and a second-B barrier layer (142), wherein one of the second-A barrier layer and the second-B barrier layer may comprise a metal oxide or a metalloid oxide, and the other may comprise a metal nitride or a metalloid nitride.

The second barrier layer (140) may further comprise a second-C barrier layer (143). In such a case, the second-C barrier layer may comprise an acrylic-based resin, an epoxy-based resin, a silicone-based resin, a polyimide-based resin, or a polyurethane-based resin.

In another embodiment, the first barrier layer comprises a first-A barrier layer and a first-B barrier layer, wherein the thickness ratio of the first-A barrier layer and the first-B barrier layer is 1:2 to 1:10. In such a case, the first-A barrier layer comprises a metal nitride or a metalloid nitride, and the first-B barrier layer comprises a metal oxide or a metalloid oxide.

The thickness ratio of the first-A barrier layer and the first-B barrier layer may be 1:2.5 to 1:7.5, but it is not limited thereto.

As the thickness ratio of the first-A barrier layer and the first-B barrier layer satisfies the above range, there is an effect that long-term reliability such as optical properties, refractive index, and weatherability of a film are improved. If the thickness ratio of the first-A barrier layer and the first-B barrier layer is outside the above range, the refractive index may be decreased, it becomes opaque, or long-term reliability such as optical properties and weatherability may be decreased.

In addition, the second barrier layer comprises a second-A barrier layer and a second-B barrier layer, wherein the thickness ratio of the second-A barrier layer and the second-B barrier layer may be 1:2 to 1:10. In such a case, the second-A barrier layer comprises a metal nitride or a metalloid nitride, and the second-B barrier layer comprises a metal oxide or a metalloid oxide.

The thickness ratio of the second-A barrier layer and the second-B barrier layer may be 1:2.5 to 1:7.5, but it is not limited thereto.

As the thickness ratio of the second-A barrier layer and the second-B barrier layer satisfies the above range, there is an effect that long-term reliability such as optical properties, refractive index, and weatherability of a film are improved. If the thickness ratio of the second-A barrier layer and the second-B barrier layer is outside the above range, the refractive index may be decreased, it becomes opaque, or long-term reliability such as optical properties and weatherability may be decreased.

In an embodiment, the first barrier layer comprises a first-A barrier layer and a first-B barrier layer, wherein the first base layer, the first-A barrier layer, and the first-B barrier layer are sequentially laminated, the first-A barrier layer comprises a metal nitride or a metalloid nitride, and the first-B barrier layer comprises a metal oxide or a metalloid oxide.

In another embodiment, the first barrier layer comprises a first-A barrier layer, a first-B barrier layer, and a first-C barrier layer, wherein the first base layer, the first-A barrier layer, the first-B barrier layer, and the first-C barrier layer are sequentially laminated, the first-A barrier layer comprises a metal nitride or a metalloid nitride, the first-B barrier layer comprises a metal oxide or a metalloid oxide, and the first-C barrier layer comprises an acrylic-based resin, an epoxy-based resin, a silicone-based resin, a polyimide-based resin, or a polyurethane-based resin.

In such a case, the first-A barrier layer may have a thickness of 10 nm to 50 nm, 10 nm to 40 nm, or 10 nm to 30 nm, but it is not limited thereto.

In addition, the first-B barrier layer may have a thickness of 30 nm to 100 nm, 30 nm to 80 nm, 30 nm to 70 nm, or 40 nm to 60 nm, but it is not limited thereto.

The first-A barrier layer and the first-B barrier layer may each have a moisture permeability of 0.2 g/day·m² or less, 0.15 g/day·m² or less, or 0.1 g/day·m² or less, but it is not limited thereto.

As the thickness range and moisture permeability of the first-A barrier layer and the first-B barrier layer satisfy the above ranges, there is an effect that long-term reliability such as optical properties, refractive index, and weatherability of a film are improved. On the other hand, if they are outside the above ranges, the refractive index may be decreased, it becomes opaque, or long-term reliability such as optical properties and weatherability may be decreased.

In an embodiment, the second barrier layer comprises a second-A barrier layer and a second-B barrier layer, wherein the second base layer, the second-A barrier layer, and the second-B barrier layer are sequentially laminated, the second-A barrier layer comprises a metal nitride or a metalloid nitride, and the second-B barrier layer comprises a metal oxide or a metalloid oxide.

In addition, the second barrier layer comprises a second-A barrier layer, a second-B barrier layer, and a second-C barrier layer, wherein the second base layer, the second-A barrier layer, the second-B barrier layer, and the second-C barrier layer are sequentially laminated, the second-A barrier layer comprises a metal nitride or a metalloid nitride, the second-B barrier layer comprises a metal oxide or a metalloid oxide, and the second-C barrier layer comprises an acrylic-based resin, an epoxy-based resin, a silicone-based resin, a polyimide-based resin, or a polyurethane-based resin.

In such a case, the second-A barrier layer may have a thickness of 10 nm to 50 nm, 10 nm to 40 nm, or 10 nm to 30 nm, but it is not limited thereto.

In addition, the second-B barrier layer may have a thickness of 30 nm to 100 nm, 30 nm to 80 nm, 30 nm to 70 nm, or 40 nm to 60 nm, but it is not limited thereto.

The second-A barrier layer and the second-B barrier layer may each have a moisture permeability of 0.2 g/day·m² or less, 0.15 g/day·m² or less, or 0.1 g/day·m² or less, but it is not limited thereto.

As the thickness range and moisture permeability of the second-A barrier layer and the second-B barrier layer satisfy the above ranges, there is an effect that long-term reliability such as optical properties, refractive index, and weatherability of a film are improved. On the other hand, if they are outside the above ranges, the refractive index may be decreased, it becomes opaque, or long-term reliability such as optical properties and weatherability may be decreased.

The moisture permeability of the first barrier layer may be the same as, or different from, that of the second barrier layer. Specifically, the moisture permeability of the first barrier layer may be different from that of the second barrier layer.

The first barrier layer and the second barrier layer may be deposited on the first base layer and the second base layer by a vacuum deposition method, respectively. Specifically, the first barrier layer and the second barrier layer may be deposited on each of the first base layer and the second base layer by a sputtering deposition method.

In such a case, the deposition raw material may be one or more of a metal or a metalloid, and the type thereof is not particularly limited. For example, it may comprise at least one selected from magnesium (Mg), silicon (Si), indium (In), titanium (Ti), bismuth (Bi), germanium (Ge), and aluminum (Al). The deposition reaction gas may comprise oxygen ($O_2$) gas or nitrogen ($N_2$) gas. If oxygen gas is used as the reaction gas, a barrier layer comprising a metal oxide or a metalloid oxide may be formed. If nitrogen gas is used as the reaction gas, a barrier layer comprising a metal nitride or a metalloid nitride may be formed. If oxygen gas and nitrogen gas are appropriately mixed and used as the reaction gas, a barrier layer comprising a metal oxynitride or a metalloid oxynitride may be formed.

The vacuum deposition method includes a physical vacuum deposition method and a chemical vacuum deposition method. The physical vacuum deposition method includes thermal vacuum deposition, E-beam vacuum deposition, and sputtering deposition.

The sputtering may be DC magnetron sputtering or AC magnetron sputtering.

The DC magnetron sputtering may be, specifically, plasma sputtering, for example, reactive plasma sputtering.

As a specific embodiment, the first barrier layer comprises a first-A barrier layer and a first-B barrier layer, wherein the first base layer, the first-A barrier layer, and the first-B barrier layer are sequentially laminated, the first-A barrier layer comprises a silicon nitride (SiNx), and the first-B barrier layer comprises a silicon oxide (SiOx). In addition, optionally, the first barrier layer may further comprise a first-C barrier layer comprising an acrylic-based resin.

When the first-A barrier layer comprises a silicon nitride, the ratio of Si:N may be 1.0:0.8 to 1.0:1.2, but it is not limited thereto. When the first-B barrier layer comprises a silicon oxide, the ratio of Si:O may be 1.0:1.7 to 1.0:2.3, but it is not limited thereto.

In addition, the second barrier layer comprises a second-A barrier layer and a second-B barrier layer, wherein the second base layer, the second-A barrier layer, and the second-B barrier layer are sequentially laminated, the second-A barrier layer comprises a silicon nitride (SiNx), and the second-B barrier layer comprises a silicon oxide (SiOx). In addition, optionally, the second barrier layer may further comprise a second-C barrier layer comprising an acrylic-based resin, an epoxy-based resin, a silicone-based resin, a polyimide-based resin, or a polyurethane-based resin.

When the second-A barrier layer comprises a silicon nitride, the ratio of Si:N may be 1.0:0.8 to 1.0:1.2, but it is not limited thereto. When the second-B barrier layer comprises a silicon oxide, the ratio of Si:O may be 1.0:1.7 to 1.0:2.3, but it is not limited thereto.

As the first barrier layer and the second barrier layer satisfy the above conditions, a desired performance can be achieved even with a thin thickness, and the prevention of moisture penetration can be maximized, whereby the durability and long-term stability of the electrochromic device can be enhanced.

Light Transmission Variable Structure

The light transmission variable structure (130) comprises a first electrode layer (131); a first chromic layer (133) on the first electrode layer (131); an electrolyte layer (135) on the first chromic layer (133); a second chromic layer (137) on the electrolyte layer (135); and a second electrode layer (139) on the second chromic layer (137) (see FIG. 4).

The light transmission variable structure (130) may be a structure in which a first electrode layer (131), a first chromic layer (133), an electrolyte layer (135), a second chromic layer (137), and a second electrode layer (139) are sequentially laminated. Specifically, the light transmittance variable structure is a laminate structure in which the light transmittance is reversibly changed when a predetermined voltage is applied.

Specifically, when a voltage is applied to the first electrode layer (131) and the second electrode layer (139), the overall light transmittance increases and then decreases due to specific ions or electrons that move from the second chromic layer (137) to the first chromic layer (133) through the electrolyte layer (135).

If the light transmittance of the second chromic layer (137) is decreased, the light transmittance of the first chromic layer (133) is also decreased. If the light transmittance of the second chromic layer (137) is increased, the light transmittance of the first chromic layer (133) is also increased.

The first electrode layer and the second electrode layer may each comprise a transparent electrode or a reflective electrode. In an embodiment, one of the first electrode layer and the second electrode layer may be a transparent electrode, and the other may be a reflective electrode. In another embodiment, both the first electrode layer and the second electrode layer may be transparent electrodes.

The first electrode layer (131) may be formed on the first barrier layer (120) by a sputtering deposition method. In addition, the second electrode layer (139) may be formed on the second barrier layer (140) by a sputtering deposition method.

The transparent electrode may be made of a material having high transmittance of light, low sheet resistance, and penetration resistance, and it may be formed in the shape of an electrode plate.

The transparent electrode may comprise one, for example, selected from the group consisting of indium-tin oxide (ITO), zinc oxide (ZnO), indium-zinc oxide (IZO), and combinations thereof.

The reflective electrode, for example, may comprise at least one selected from the group consisting of silver (Ag), aluminum (Al), copper (Cu), molybdenum (Mo), gold (Au), tungsten (W), chromium (Cr), and combinations thereof.

The first electrode layer (131) and the second electrode layer (139) may each have a thickness of 100 nm to 500 nm, 100 nm to 400 nm, 100 nm to 300 nm, or 150 nm to 250 nm, but it is not limited thereto.

The first electrode layer and the second electrode layer may each be a transparent electrode and comprise indium-tin oxide (ITO).

Specifically, the first electrode layer and the second electrode layer may each comprise indium oxide:tin oxide at a weight ratio of 70:30 to 98:2 or 80:20 to 97:3.

In addition, the first electrode layer and the second electrode layer may each have a surface resistance of 5 Ω/sq to 100 Ω/sq, 5 Ω/sq to 80 Ω/sq, 5 Ω/sq to 70 Ω/sq, or 5 Ω/sq to 50 Ω/sq, but it is not limited thereto.

The first chromic layer (133) is a layer whose light transmittance changes when a voltage is applied between the first electrode layer (131) and the second electrode layer (139). It is a layer that imparts variability of light transmittance to the electrochromic device.

The first chromic layer (133) may comprise at least one layer and, if necessary, may comprise two or more layers of different materials.

The first chromic layer (133) may be formed by depositing a raw material on one side of the first electrode layer (131) by a sputtering method or by applying a raw material by a wet coating method and then drying it.

The first electrode layer (131) and the first chromic layer (133) may have an initial transmittance of 90% or more. Specifically, that the initial transmittance satisfies the above range means that each of the above-described layers has been applied very uniformly and is very transparent.

The electrolyte layer (135) is a layer that serves as an ion transport path between the first chromic layer and the second chromic layer. The type of electrolyte used in the electrolyte layer is not particularly limited.

For example, the electrolyte layer may comprise hydrogen ions or Group 1 Element ions. Specifically, the electrolyte layer may comprise a lithium salt compound. The lithium salt compound may be $LiClO_4$, $LiBF_4$, $LiAsF_6$, $LiPF_6$, LiTFSI, LiFSI, or the like, but it is not limited thereto.

In addition, the electrolyte layer may comprise a polymer resin. Specifically, the electrolyte layer may comprise an acrylic-based resin, an epoxy-based resin, a silicone-based resin, a polyimide-based resin, or a polyurethane-based resin, but it is not limited thereto.

Specifically, the acrylic-based resin may be a thermosetting acrylic-based resin, a photocurable acrylic-based resin, or the like. The polyurethane-based resin may be a thermosetting polyurethane-based resin, a photocurable polyurethane-based resin, an aqueous polyurethane-based resin, or the like.

The electrolyte layer may comprise a polymer resin and a lithium salt at a weight ratio of 95:5 to 80:20, 95:5 to 85:15, or 93:7 to 87:3.

The electrolyte layer may have an ionic conductivity of $10^{-5}$ mS/cm or more. Specifically, the ionic conductivity of the electrolyte layer may be $10^{-4}$ mS/cm to $10^3$ mS/cm or $10^{-3}$ mS/cm to $10^2$ mS/cm. Specifically, the ionic conductivity of the electrolyte layer may be 30 μS/cm or more, 40 μS/cm or more, 50 μS/cm or more, 60 μS/cm or more, or 80 μS/cm or more, but it is not limited thereto.

The electrolyte layer may have an adhesive strength of 200 g/inch or more. Specifically, the adhesive strength of the electrolyte layer may be 300 g/inch to 900 g/inch or 450 g/inch to 650 g/inch, but it is not limited thereto.

The electrolyte layer (135) may be formed by applying a raw material to one side of any one of the first chromic layer (133) or the second chromic layer (137) by a wet coating method and then drying it.

If the electrolyte layer is applied by a wet coating method, the thickness of the coating film can be increased or the thickness of the coating film can be easily controlled, which is advantageous from the viewpoint of enhancing ionic conductivity or chromic speed. On the other hand, if a sputtering coating method, rather than a wet coating method, is used for the electrolyte layer, the coating film may be easily broken or the ionic conductivity may be reduced due to the formation of a thin film.

The electrolyte layer (135) may have a thickness of 30 μm to 200 μm, 50 μm to 200 μm, 50 μm to 150 μm, 70 μm to 130 μm, or 80 μm to 120 μm. If the thickness of the electrolyte layer (135) satisfies the above range, durability is imparted to the electrochromic device. At the same time, the transport path of ions between the first chromic layer and the second chromic layer is secured in an appropriate length, whereby an appropriate speed in the light transmission change performance can be achieved.

The second chromic layer (137) is a layer whose light transmittance changes when a voltage is applied between the first electrode layer (131) and the second electrode layer (139). It is a layer that imparts variability of light transmittance to the electrochromic device.

The second chromic layer (137) comprises at least one layer and, if necessary, may comprise two or more layers of different materials.

The second chromic layer (137) may be formed by depositing a raw material on one side of the second electrode layer (139) by a sputtering method or by applying a raw material by a wet coating method and then drying it.

The second chromic layer (137) has an initial transmittance of 50% or less. Specifically, that the initial transmittance satisfies the above range means that it exhibits a dark blue or pale indigo color when viewed with the naked eye.

Release Film Layer

Figure 6:
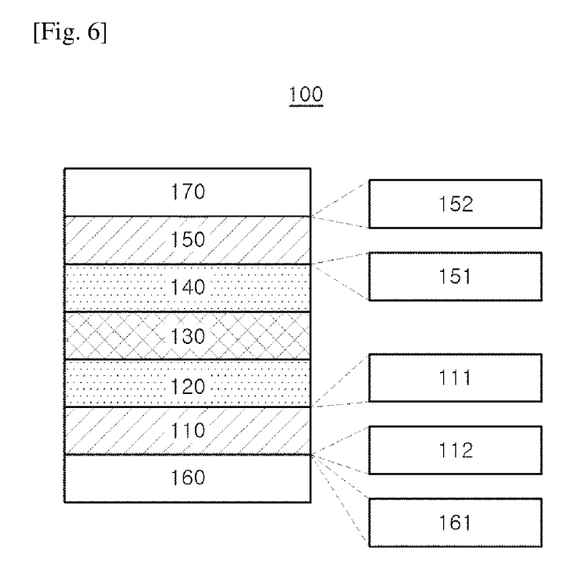
FIG. 6 schematically shows a cross-section of an electrochromic device according to an embodiment.

The electrochromic device (100) according to an embodiment may further comprise a release film layer (160) on the side of the first base layer (110) opposite to the side on which the first barrier layer (120) is laminated (see FIG. 6).

The release film layer (160) may comprise a polyester-based resin comprising polyethylene terephthalate (PET), polyethylene naphthalate (PEN), or polycarbonate (PC).

Specifically, the release film layer may have a thickness of 10 μm to 100 μm, 10 μm to 80 μm, 10 μm to 50 μm, or 12 μm to 50 μm, but it is not limited thereto.

The release film layer has a peel strength of 50 gf/inch or less. Specifically, the peel strength of the release film layer may be 3 gf/inch to 50 gf/inch or 10 gf/inch to 50 gf/inch, but it is not limited thereto.

The release film layer serves to protect the electrochromic device from external moisture or impurities during storage and transport of the electrochromic device. When the electrochromic device is later applied to a transparent window or the like, it may be used after the release film layer is removed, if necessary. The release film layer may particularly prevent a decrease in adhesive strength of the adhesive layer.

An adhesive layer (161) may be formed on one side of the release film layer.

The adhesive layer (161) may comprise an acrylic-based resin, a silicone-based resin, a polyurethane-based resin, an epoxy-based resin, or a polyimide-based resin.

Specifically, the adhesive layer may comprise an acrylic resin in which case it is advantageous for enhancing the optical properties and durability.

The adhesive layer may have a blocking rate of UV rays (based on 400 nm) of 95% or more, 97% or more, 98% or more, or 99% or more, but it is not limited thereto.

In addition, the adhesive layer may have an initial adhesive strength of 0.5 N/inch to 8.0 N/inch, 1.0 N/inch to 7.0 N/inch, or 2.0 N/inch to 6.0 N/inch, but it is not limited thereto.

Primer Layer

A primer layer may be laminated on one or both sides of the first base layer (110). Specifically, a first-A primer layer (111) may be laminated on one side of the first base layer (110), and a first-B primer layer (112) may be laminated on the other side (see FIG. 6).

In addition, a primer layer may be laminated on one or both sides of the second base layer (150). Specifically, a second-A primer layer (151) may be laminated on one side of the second base layer (150), and a second-B primer layer (152) may be laminated on the other side (see FIG. 6).

In an embodiment, a primer layer may be interposed between the first barrier layer (120) and the first base layer (110). In addition, a primer layer may be interposed between the second barrier layer (140) and the second base layer (150) (see FIG. 6).

The primer layers (first-A primer layer, first-B primer layer, second-A primer layer, and second-B primer layer) may each comprise an acrylic-based resin, a polyurethane-based resin, a silicone-based resin, or a polyimide-based resin.

The primer layers (first-A primer layer, first-B primer layer, second-A primer layer, and second-B primer layer) may each have a surface tension of 35 dyne/cm$^2$ or less or a surface tension of 30 dyne/cm$^2$ or less.

The primer layers (first-A primer layer, first-B primer layer, second-A primer layer, and second-B primer layer) may each have an adhesive strength of 3.0 gf/inch or more or an adhesive strength of 3.5 gf/inch or more.

The primer layer serves to impart adhesion between the base layer and the barrier layer or to improve the refractive index. In addition, the material forming the respective primer layers, surface tension, peel strength, and the like may be the same or different.

Hard Coat Layer

The electrochromic device (100) according to an embodiment may further comprise a hard coat layer (170) on the side of the second base layer (150) opposite to the side on which the second barrier layer (140) is laminated (see FIG. 6).

The hard coat layer (170) may comprise an acrylic-based resin, a silicone-based resin, a polyurethane-based resin, an epoxy-based resin, or a polyimide-based resin.

The hard coat layer may have a thickness of 1 μm to 10 μm, 2 μm to 8 μm, 2 μm to 6 μm, or 2 μm to 5 μm, but it is not limited thereto.

The hard coat layer may have a pencil hardness of 3H or higher, 4H or higher, or 5H or higher, but it is not limited thereto.

The hard coat layer serves to protect the electrochromic device from external impacts, and it may impart excellent hardness by virtue of its resistance to scratches.

In addition, as the thickness of the hard coat layer satisfies the above range, it is possible to achieve an electrochromic device having flexibility and excellent workability. If the thickness of the hard coat layer exceeds the above range, it is difficult to achieve flexibility. If the thickness of the hard coat layer is less than the above range, it may be vulnerable to external impacts.

In a specific embodiment, the electrochromic device (100) may comprise a release film layer (160); an adhesive layer (161) on the release film layer (160); a first-B primer layer (112) on the adhesive layer (161); a first base layer (110) on the first-B primer layer (112); a first-A primer layer (111) on the first base layer (110); a first barrier layer (120) on the first-A primer layer (111); a light transmission variable structure (130) on the first barrier layer (120); a second barrier layer (140) on the light transmission variable structure (130); a second-A primer layer (151) on the second barrier layer (140); a second base layer (150) on the second-A primer layer (151); a second-B primer layer (152) on the second base layer (150); and a hard coat layer (170) on the second-B primer layer (152).

Characteristics and Application

The electrochromic device may be a flexible electrochromic device.

The features such as components and properties of each layer of the electrochromic device described above may be combined with each other.

Figure 1:
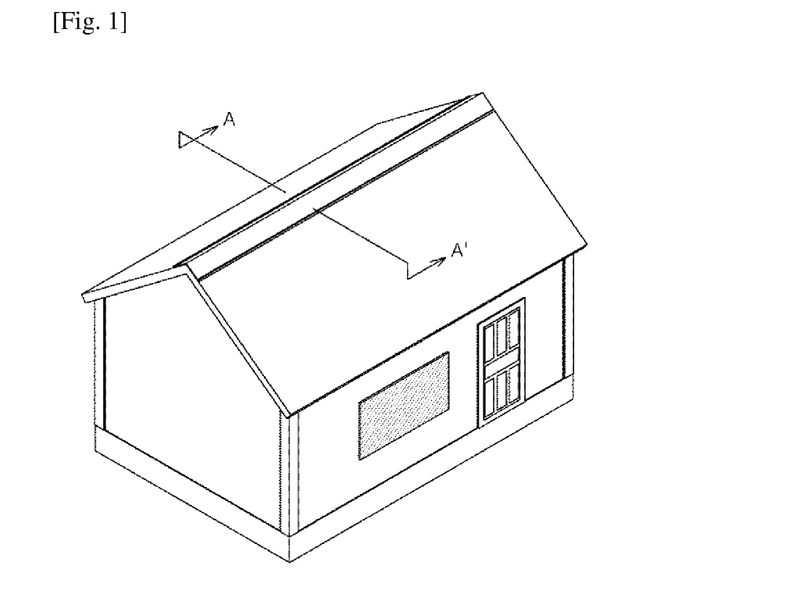
FIG. 1 is a perspective view conceptually showing a window to which an electrochromic device according to an embodiment is applied.
Figure 2:
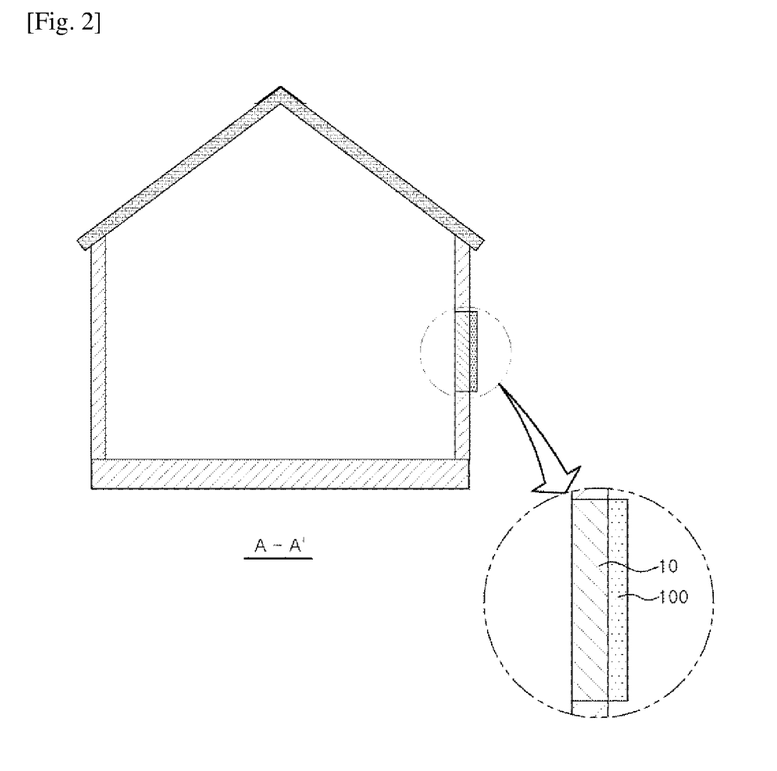
FIG. 2 is a cross-sectional view taken along line A-A' in FIG. 1 and an enlarged view thereof.

The electrochromic device (100) can be applied by simply attaching it to a structure such as a conventional transparent window. Specifically, as shown in FIG. 1, it may be attached to one side of a window. More specifically, FIG. 2 shows a cross-sectional view taken along line A-A' in FIG. 1 and an enlarged view of the part where the electrochromic device has been applied.

The electrochromic device (100) may be attached to one side of the window (10), wherein the window (10) may have a flat surface or a curved surface.

In addition, the electrochromic device (100) may be attached to the entire side of the window (10) or may be attached to only a part of the window (10).

In addition, the electrochromic device (100) may be inserted into the window (10). Specifically, the electrochromic device may be applied through a method of interposing it between glass substrates. More specifically, it can be applied in a way in which two polyvinyl butyral (PVB) films are interposed between laminated glasses of a window, and the electrochromic device is interposed between the two PVB films. It can be stably inserted into the window as it tightly attaches by applying heat.

The electrochromic device (100) may have a thickness of 20 μm to 1,000 μm. Specifically, the thickness of the electrochromic device (100) may be 25 μm to 900 μm, 25 μm to 800 μm, 25 μm to 700 μm, 25 μm to 600 μm, or 25 μm to 500 μm, but it is not limited thereto.

The electrochromic device may have a transmittance for visible light of 10% to 40%, 10% to 30%, or 10% to 20%, when decoloration is maximally driven, but it is not limited thereto.

In addition, the electrochromic device may have a transmittance for visible light of 40% to 90%, 50% to 90%, or 60% to 80%, when coloration is maximally driven, but it is not limited thereto.

The electrochromic device may control the transmittance for infrared and ultraviolet rays as well as visible light during coloration and decoloration.

When the transmittance of visible light of the electrochromic device changes from 15% to 65%, the $dI/dV_{(15-65)}$ value, which is a value obtained by dividing the change (%) in transmittance of IR rays by 50%, may be 0.42 to 0.5. Specifically, the $dI/dV_{(15-65)}$ value may be 0.43 to 0.5, 0.44 to 0.5, or 0.46 to 0.5.

When the transmittance of visible light of the electrochromic device changes from 15% to 65%, the change (%) in transmittance of IR rays may be 20% to 25% or 22% to 25%.

When the transmittance of visible light of the electrochromic device changes from 40% to 25%, the $dI/dV_{(40-25)}$ value, which is a value obtained by dividing the change (%) in transmittance of IR rays by 15%, may be 0.46 to 0.56. Specifically, the $dI/dV_{(40-25)}$ value may be 0.48 to 0.56, 0.48 to 0.54, or 0.49 to 0.53.

When the transmittance of visible light of the electrochromic device changes from 40% to 25%, the change (%) in transmittance of IR rays may be 7% to 10% or 7% to 8%.

When the transmittance of visible light of the electrochromic device changes from 15% to 65%, the $dU/dV_{(15-65)}$ value, which is a value obtained by dividing the change (%) in transmittance of UV rays by 50%, may be 0.38 to 0.46. Specifically, the $dU/dV_{(15-65)}$ value may be 0.39 to 0.46.

When the transmittance of visible light of the electrochromic device changes from 15% to 65%, the change (%) in transmittance of UV rays may be 6% to 9% or 6% to 8%.

When the transmittance of visible light of the electrochromic device changes from 40% to 25%, the $dU/dV_{(40-25)}$ value, which is a value obtained by dividing the change (%) in transmittance of UV rays by 15%, may be 0.40 to 0.58. Specifically, the $dU/dV_{(40-25)}$ value may be 0.42 to 0.58, 0.44 to 0.56, or 0.44 to 0.54.

When the transmittance of visible light of the electrochromic device changes from 40% to 25%, the change (%) in transmittance of UV rays may be 6% to 9% or 6% to 8%.

As the electrochromic device satisfies specific numerical ranges related to the changes in transmittance of visible light, transmittance of IR rays, and transmittance of UV rays as described above, it is possible to secure a wide range of changes in transmittance of visible light, as well as to stably achieve at least certain level of performance despite repeated coloration and decoloration.

If the changes in transmittance of an electrochromic device are outside the above numerical ranges, the blocking rate of visible light decreases, or cracks may be formed during coloration and decoloration, making it impossible to stably achieve light transmittance variable performance. Thus, the above numerical ranges are of significance.

In the present specification, visible light is light having a wavelength range perceived by the eye and is an electromagnetic wave having a wavelength in the range of 380 nm to 780 nm.

IR rays are light having a stronger thermal action than visible or UV rays and are electromagnetic waves having a wavelength in the range of 780 nm to 2,500 nm.

UV rays are light that burns or sterilizes human skin and may cause skin cancer when excessively exposed thereto and are electromagnetic waves having a wavelength in the range of 100 nm to 380 nm.

When the transmittance of visible light of the electrochromic device is 15%, the transmittance of IR rays may be 23% or less.

As the transmittance of IR rays satisfies the above range, it is possible to save indoor energy. Specifically, solar energy has different intensities for each wavelength. Since IR rays occupy about 50% of the total energy and have a strong thermal action, the indoor temperature rises when a lot of IR rays are irradiated. The electrochromic device according to the embodiment secures a transmittance of IR rays of 23% or less, that is, a blocking rate of IR rays being 77% or more. Thus, it is possible to block hot solar energy in summer, thereby saving indoor energy for cooling. In addition, the indoor space can be warmed in cold winter by lowering the blocking rate of IR rays through just a simple operation, thereby saving indoor energy for heating.

When the transmittance of visible light of the electrochromic device is 15%, the transmittance of UV rays may be 3% or less.

As the transmittance of IR rays satisfies the above range, it is possible to block harmful light that causes skin cancer or corneal damage. Specifically, research has shown that exposure to UV rays for a long period of time causes skin cancer or corneal damage. In Korea, it is recommended to wear sunglasses or use a sunscreen in summer when sunlight is strong. The blocking effect of sunscreen is indicated with an SPF index. It is known that the UV blocking rate of SPF 15 products recommended for light outdoor activities is 93%, and the UV blocking rate of SPF 30 products recommended for long outdoor activities is 97%. The electrochromic device according to the embodiment secures a transmittance of UV rays of 3% or less, that is, a blocking rate of UV rays being 97% or more, when the transmittance of visible light is 15%. Thus, it is possible to achieve the performance of a sunscreen recommended for long-term outdoor activities, which enables users in a building or a vehicle to which the electrochromic device is applied to be protected from ultraviolet rays.

When electric power is applied to the electrochromic device, an electric field is formed between the two electrodes, giving rise to coloration and decoloration, so that the transmittance can be adjusted for each wavelength of sunlight. Thus, an insulation function and a shading function can be advantageously achieved.

In addition, the electrochromic device of a large area can be fabricated at a low cost, and its power consumption is low. Thus, it is suitable for use as a smart window, a smart mirror, or other next-generation architectural window materials.

Since the electrochromic device (100) has a thin thickness and lightweight and flexible characteristics, it has excellent workability and a low possibility of breakage, it can be stored in a roll form, and it is convenient to transport.

MODE FOR THE INVENTION

Hereinafter, the present invention will be described in more detail with reference to the following examples. However, these examples are set forth to illustrate the present invention, and the scope of the present invention is not limited thereto.

Example 1

Two transparent electrode substrates on which an ITO electrode having a surface resistance of 50 Ω/sq, a barrier layer, a primer layer, and a PET base layer (thickness: 125 μm) had been laminated were used as upper and lower plates, respectively. Tungsten oxide was applied to the ITO electrode of the lower plate through sputtering deposition to form a reducing chromic layer (thickness: 200 nm). Nickel oxide was applied to the ITO electrode of the upper plate through sputtering deposition to form an oxidizing chromic layer (thickness: 300 nm). A gel electrolyte (ion conductivity of 50 μS/cm or more) was interposed between the reducing chromic layer and the oxidizing chromic layer, and the upper and lower plates were laminated to prepare an electrochromic device sample (150 mm×150 mm). Subsequently, copper tapes were attached to the sides of the upper and lower plates to form a bus bar for power connection.

Examples 2 to 4 and Comparative Examples 1 and 2

An electrochromic device sample was prepared in the same manner as in Example 1, except that the thicknesses of the reducing chromic layer and the oxidizing chromic layer were changed as shown in Table 1 below.

Evaluation Example

The following properties of the electrochromic devices fabricated in Examples 1 to 4 and Comparative Examples 1 and 2 were measured and evaluated, and the results are shown in Table 1.

a: thickness (nm) of the reducing chromic layer (first chromic layer)

b: thickness (nm) of the oxidizing chromic layer (second chromic layer)

T1 (coloring time): time (s) for which the transmittance of visible light changed from 65% to 15% when an electric power of 3V was applied to the fabricated electrochromic device T2 (decoloring time): time (s) for which the transmittance of visible light changed from 15% to 65% when the current direction was reversed after the coloring time was measured $dI/dV_{(15-65)}$=change (%) in transmittance of IR rays/50% when the transmittance of visible light changed from 15% to 65%

$dI/dV_{(40-25)}$=change (%) in transmittance of IR rays/15% when the transmittance of visible light changed from 40% to 25%

$dU/dV_{(15-65)}$=change (%) in transmittance of UV rays/50% when the transmittance of visible light changed from 15% to 65%

$dU/dV_{(40-25)}$=change (%) in transmittance of UV rays/15% when the transmittance of visible light changed from 40% to 25%

Measurement method of transmittance: measured at intervals of 5 nm in a wavelength range of 200 nm to 2,500 nm using Ultraviolet spectrum of JASCO.

Specifically, the transmittance of visible light was based on the value at 650 nm. The transmittance of UV rays was based on an average of the values measured at 5 nm intervals in the wavelength range of 280 nm to 380 nm. The transmittance of IR rays was based on an average of the values measured at 5 nm intervals in the wavelength range of 1,000 nm to 2,500 nm.

TABLE 1

|  | Ex. 1 | Ex. 2 | Ex. 3 | Ex. 4 | C. Ex. 1 | C. Ex. 2 |
| --- | --- | --- | --- | --- | --- | --- |
| a | 200 | 200 | 300 | 300 | 100 | 300 |
| b | 300 | 400 | 500 | 600 | 300 | 700 |
| b/a | 1.5 | 2 | 1.67 | 2 | 3 | 2.3 |
| Ti (coloring time, s) (65% -> 15%) | 9 | 9 | 10 | 10 | 8 (65% -> 17%) | 10 |
| T2 (decoloring time, s) (15% -> 65%) | 6 | 7 | 7 | 8 | 6 (17% -> 65%) | 8 |
| T2/T1 | 6/9 | 7/9 | 7/10 | 8/10 | 6/8 | 8/10 |
| c | 1 | 1.56 | 1.17 | 1.6 | 2.25 | 1.87 |
| Change (%) in transmittance of IR rays when transmittance of visible light changed 15% -> 65% | 23.2 | 24.3 | 23.8 | 24.6 | 19.8 (17% -> 65%) | 25.2 (non-uniform) |
| $dI/dV_{(15-65)}$ | 0.464 | 0.486 | 0.476 | 0.492 | 0.413 | 0.504 |
| Change (%) in transmittance of IR rays when transmittance of visible light changed 40% -> 25% | 7.5 | 7.9 | 7.6 | 7.9 | — | — |

TABLE 1-continued

| | Ex. 1 | Ex. 2 | Ex. 3 | Ex. 4 | C. Ex. 1 | C. Ex. 2 |
|---|---|---|---|---|---|---|
| $dI/dV_{(40-25)}$ | 0.497 | 0.525 | 0.510 | 0.527 | — | — |
| Change (%) in transmittance of UV rays when transmittance of visible light changed 15% -> 65% | 19.5 | 20.6 | 22.0 | 22.9 | 17.8 (17% -> 65%) | 23.3 (non-uniform) |
| $dU/dV_{(15-65)}$ | 0.39 | 0.41 | 0.44 | 0.46 | 0.37 | 0.47 |
| Change (%) in transmittance of UV rays when transmittance of visible light changed 40% -> 25% | 6.7 | 6.9 | 7.6 | 7.8 | — | — |
| $dU/dV_{(40-25)}$ | 0.45 | 0.46 | 0.51 | 0.52 | — | — |
| Transmittance (%) of IR rays when transmittance of visible ray was 15% | 21.3 | 20.7 | 20.3 | 19.8 | 23.8 | 19.5 |
| Transmittance (%) of UV rays when transmittance of visible ray was 15% | 2.7 | 2.5 | 2.2 | 2.0 | 3.8 (17%) | 1.9 |

As can be seen from Table 1, the electrochromic devices of Examples 1 to 4 had a c value in the range of 1.0 to 1.6, thereby having a uniform thickness and performance while securing a high blocking rate of visible light and a wide range of the changes in transmittance of visible light.

In contrast, in the electrochromic device of Comparative Example 1, the blocking rate of visible light was deteriorated as the c value was 2.25, exceeding 1.6. Specifically, in the electrochromic devices of Examples 1 to 4, the transmittance of visible light was stably changed from 15% to 65%. On the other hand, in Comparative Example 1, the minimum transmittance of visible light was only 17%. For reference, in Table 1, the coloring/decoloring times of Comparative Example 1 were the times measured when the transmittance of visible light changed from 17% to 65% and from 65% to 17%.

In addition, in the electrochromic device of Comparative Example 2, fine cracks and non-uniformities were observed during coloration and decoloration as the c value was 1.87, exceeding 1.6. Specifically, the non-uniformity was observed in the form of delay in operation time and failure to reach the transmittance range. As the thickness of the oxidizing chromic layer became relatively thick, the uniformity of coating between the oxide compositions decreased, and the process of forming the layer took a longer time, so that it was inevitably exposed to harsh conditions. Accordingly, in Table 1, the coloring/decoloring times of Comparative Example 2 were measured based on the uniform part.

Further, the electrochromic devices of Examples 1 to 4 had a transmittance of IR rays of 23% or less when the transmittance of visible light was 15%. This means that the blocking rate of solar energy was 77% or more, showing that indoor energy for cooling can be saved by blocking hot solar energy in summer.

In addition, the electrochromic devices of Examples 1 to 4 had a transmittance of UV rays of 3% or less when the transmittance of visible light was 15%. This means that the blocking rate of UV rays was 97% or more, indicating that the same level of performance as applying a sunscreen was achieved and that users in a building or a vehicle to which the electrochromic device had been applied could be protected from ultraviolet rays.

The invention claimed is:

1. An electrochromic device, which comprises:
 a light transmission variable structure interposed between a first base layer and a second base layer,
 wherein the light transmission variable structure comprises a first chromic layer and a second chromic layer,
 the first chromic layer comprises a reducing chromic material,
 the second chromic layer comprises an oxidizing chromic material, and
 the value of c as defined in the following Equation 1 is 1.0 to 1.6:

$$c = T2/T1 \times b/a \qquad \text{[Equation 1]}$$

in Equation 1, T1 (coloring time) is the time (s) for which the transmittance of visible light changes from 65% to 15% when an electric power of 3V is applied to the electrochromic device, T2 (decoloring time) is the time (s) for which the transmittance of visible light changes from 15% to 65% when the current direction is reversed after the coloring time is measured, a is the thickness (nm) of the first chromic layer, and b is the thickness (nm) of the second chromic layer,
 wherein the b/a value is 1.5 to 2.2,
 wherein the electrochromic device further comprises a first barrier layer interposed between the first base layer and the light transmission variable structure; and a second barrier layer interposed between the second base layer and the light transmission variable structure, and
 wherein the first barrier layer and the second barrier layer each comprise two or more layers.

2. The electrochromic device of claim 1, wherein the a value is greater than 100 nm, and the b value is less than 700 nm.

3. The electrochromic device of claim 1, wherein when the transmittance of visible light of the electrochromic device changes from 15% to 65%, the $dI/dV_{(15-65)}$ value, which is a value obtained by dividing the change (%) in transmittance of IR rays by 50%, is 0.42 to 0.5.

4. The electrochromic device of claim 1, wherein when the transmittance of visible light of the electrochromic device changes from 15% to 65%, the $dU/dV_{(15-65)}$ value, which is a value obtained by dividing the change (%) in transmittance of UV rays by 50%, is 0.38 to 0.46.

5. The electrochromic device of claim 1, wherein when the transmittance of visible light of the electrochromic device is 15%, the transmittance of IR rays is 23% or less, and the transmittance of UV rays is 3% or less.

6. The electrochromic device of claim 1, wherein the light transmission variable structure comprises:
- a first electrode layer;
- a first chromic layer on the first electrode layer;
- an electrolyte layer on the first chromic layer;
- a second chromic layer on the electrolyte layer; and
- a second electrode layer on the second chromic layer.

7. The electrochromic device of claim 1,
- wherein the first barrier layer comprises a first-A barrier layer and a first-B barrier layer,
- the second barrier layer comprises a second-A barrier layer and a second-B barrier layer,
- the thickness ratio of the first-A barrier layer and the first-B barrier layer is 1:2 to 1:10, and
- the thickness ratio of the second-A barrier layer and the second-B barrier layer is 1:2 to 1:10.

8. The electrochromic device of claim 1, wherein the first base layer and the second base layer each comprise one or more selected from the group consisting of polyethylene terephthalate (PET), polyethylene naphthalate (PEN), polycarbonate (PC), polyimide (PI), polycyclohexylenedimethylene terephthalate (PCT), polyethersulfone (PES), nylon, polymethyl methacrylate (PMMA), and cycloolefin polymer (COP).

9. The electrochromic device of claim 1, wherein the first base layer has a thickness of 10 μm to 300 μm, and the second base layer has a thickness of 10 μm to 300 μm.

* * * * *